(12) United States Patent
Huang et al.

(10) Patent No.: US 12,212,970 B2
(45) Date of Patent: *Jan. 28, 2025

(54) SECURITY FOR MULTI-LINK OPERATION

(71) Applicant: INTEL CORPORATION, Santa Clara, CA (US)

(72) Inventors: Po-Kai Huang, San Jose, CA (US); Laurent Cariou, Milizac (FR); Carlos Cordeiro, Camas, WA (US); Daniel Bravo, Portland, OR (US); Robert Stacey, Portland, OR (US); Arik Klein, Givaat Shmuel (IL); Avner Epstein, Givatayim (IL); Daniel Leiderman, Ra'anana (IL)

(73) Assignee: Intel Corporation, Santa Clara, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/077,136

(22) Filed: Dec. 7, 2022

(65) Prior Publication Data

US 2023/0224710 A1 Jul. 13, 2023

Related U.S. Application Data

(63) Continuation of application No. 16/868,334, filed on May 6, 2020, now Pat. No. 11,558,750.

(Continued)

(51) Int. Cl.
*H04L 29/06* (2006.01)
*H04L 9/40* (2022.01)
*H04W 12/041* (2021.01)
*H04W 12/06* (2021.01)
*H04W 12/10* (2021.01)

(Continued)

(52) U.S. Cl.
CPC .......... *H04W 12/50* (2021.01); *H04L 63/065* (2013.01); *H04W 12/041* (2021.01); *H04W 12/06* (2013.01); *H04W 12/10* (2013.01); *H04W 76/15* (2018.02); *H04L 2101/622* (2022.05); *H04W 84/12* (2013.01)

(58) Field of Classification Search
CPC ... H04W 12/50; H04W 76/15; H04W 12/041; H04W 12/06; H04W 12/10; H04W 84/12; H04L 63/065; H04L 61/6022
See application file for complete search history.

(56) References Cited

U.S. PATENT DOCUMENTS

2013/0196708 A1* 8/2013 Narasimhan .......... H04L 9/0827
455/525
2019/0150214 A1* 5/2019 Zhou .................... H04W 76/15
370/329

* cited by examiner

*Primary Examiner* — Evans Desrosiers
(74) *Attorney, Agent, or Firm* — Eversheds Sutherland (US) LLP

(57) ABSTRACT

This disclosure describes systems, methods, and devices related to security for multi-link operation. A device may determine a multi-link communication with a first multi-link device comprising two or more links associated with two or more station devices (STAs) included in the first multi-link device. The device may determine a first medium access control (MAC) address associated with a first link of the two or more links. The device may determine a second MAC address associated with a second link of the two or more links. The device may generate one or more pairwise security keys to be used in the multi-link communication on the two or more links. The device may cause to send a frame to the first multi-link device using at least one combination of the one or more pairwise security keys.

20 Claims, 19 Drawing Sheets

Related U.S. Application Data

(60) Provisional application No. 62/843,705, filed on May 6, 2019.

(51) Int. Cl.
*H04W 12/50* (2021.01)
*H04W 76/15* (2018.01)
H04L 101/622 (2022.01)
H04W 84/12 (2009.01)

SECURITY FOR MULTI-LINK OPERATION

CROSS-REFERENCE TO RELATED APPLICATION(S)

This application is a continuation of U.S. Non-Provisional application Ser. No. 16/868,334, filed May 6, 2020, which claims the benefit of U.S. Provisional Application No. 62/843,705, filed May 6, 2019, the disclosures of which are incorporated herein by reference as if set forth in full.

TECHNICAL FIELD

This disclosure generally relates to systems and methods for wireless communications and, more particularly, to security for multi-link operation.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation. For example, IEEE 802.11 is developed to facilitate wireless communications between devices such as client devices and access points. In case the security of a device is compromised, network security of other client devices and access points in a same network may be compromised. One such security issue may be a replay attack, where some frames (e.g., management frames) may be replayed. It is important to provide protection against these types of security issues.

DETAILED DESCRIPTION

Figure 1:
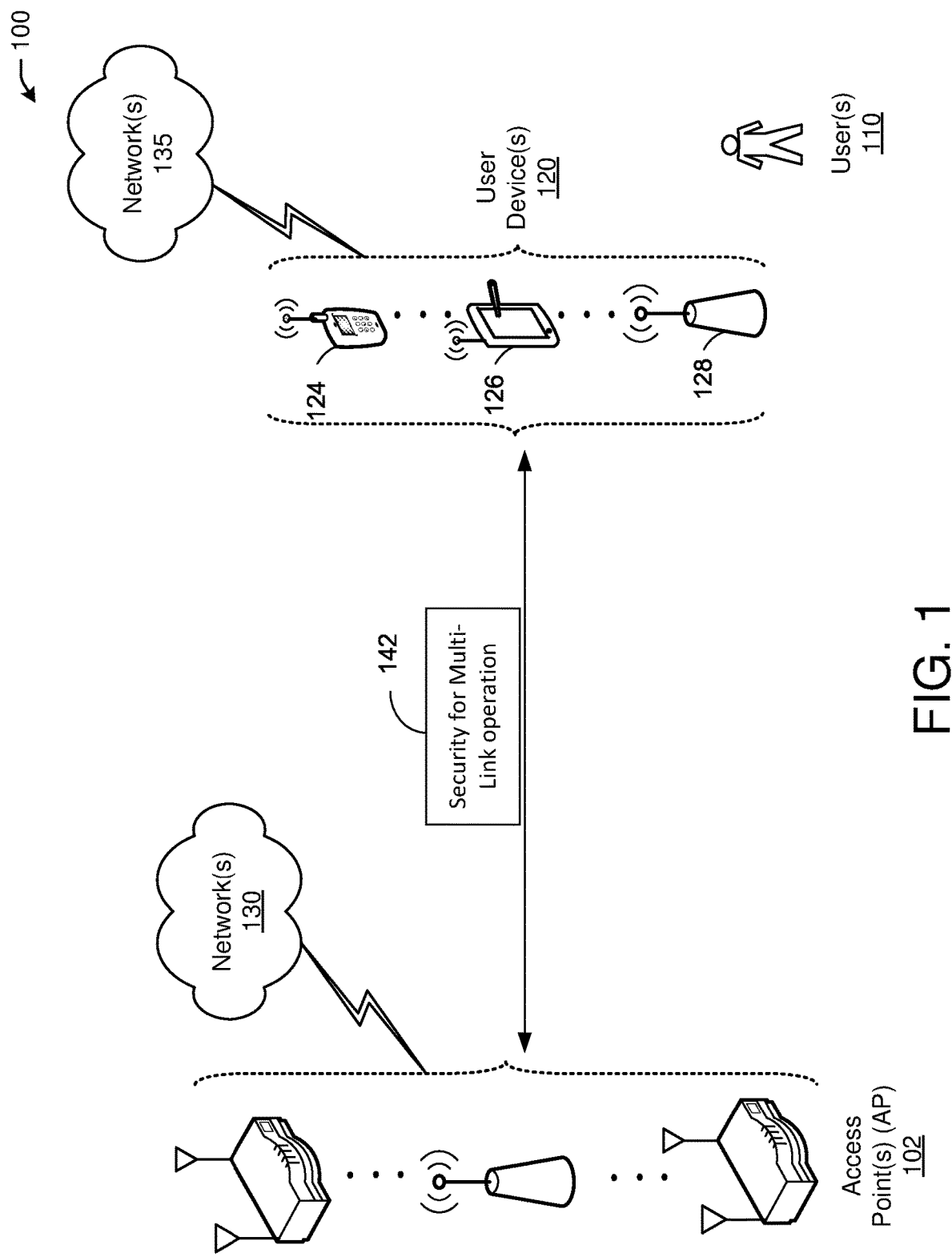
FIG. 1 is a network diagram illustrating an example network environment for security for multi-link operation, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In current 802.11, security and authentication are achieved with robust security network association (RSNA), where 802.1X is utilized, between two station devices (STAs).

Management frame protection introduced a new Key Integrity Group Temporal Key (IGTK) which would provide an integrity check by creating a message integrity code (MIC) and a new algorithm—Broadcast Integrity Protocol (BIP) for protection of Broadcast and Multicast frames. Unicast Management frames would be encrypted using the same pairwise transient keys.

Like a single link operation between two STAs, the security perspective of multi-link operation also needs to be discussed. There are a few levels of areas of concern. For example, it may be necessary to determine whether the same pairwise master key (PMK)/PMK security association (PMKSA) is used for different links, whether the same pairwise transient key (PTK)/PTK security association (PTKSA) is used for different links, whether the same group temporal key (GTK)/GTK security association (GTKSA) is used for different links, and whether the same IGTK/IGTKSA is used for different links.

Example embodiments of the present disclosure relate to systems, methods, and devices for security for multi-link operation.

In one or more embodiments, a security for multi-link operation system may have one pairwise master key (PMK) for multi-link operation.

In one or more embodiments, a security for multi-link operation system may facilitate two options for pairwise transient key (PTK) under multi-link operation.

Option 1: same PTK/PTKSA.
Option 2: different PTK/PTKSA.

In one or more embodiments, a security for multi-link operation system may facilitate two options for GTK under multi-link operation.

Option 1: same GTK/GTKSA.
Option 2: different GTK/GTKSA.

In one or more embodiments, a security for multi-link operation system may facilitate two options for IGTK under multi-link operation.

Option 1: same IGTK/IGTKSA.
Option 2: different IGTK/IGTKSA.

In one or more embodiments, a security for multi-link operation system may facilitate any combination of the above options.

Some of the advantages for using the same key/security association may include simplifying the negotiation because only one key needs to be negotiated. Further, it will simplify the storage of the key because only one key needs to be kept.

Some of the disadvantages for using the same key/security association across links would include the fact that one packet number (PN) space is shared across links, and the refreshing rate for the key may increase. Also, it is hard to control the assignment of PN, which needs to be strictly increasing, and the same PN may not be used in different links for different MPDUs when one security association is used. Depending on the implementation, if the PN assignment is implemented in the lower level, this can be a problem when trying to do aggregation, and data are flowing on different links simultaneously. When the STA in a multi-link device has different MAC addresses, certain operation needs to be modified.

In one or more embodiments, a security for multi-link operation system may facilitate a mechanism to alleviate various problems under usage of same key/security association (SA) or different key/SA under same or different MAC address.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of security for multi-link operation, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 14:
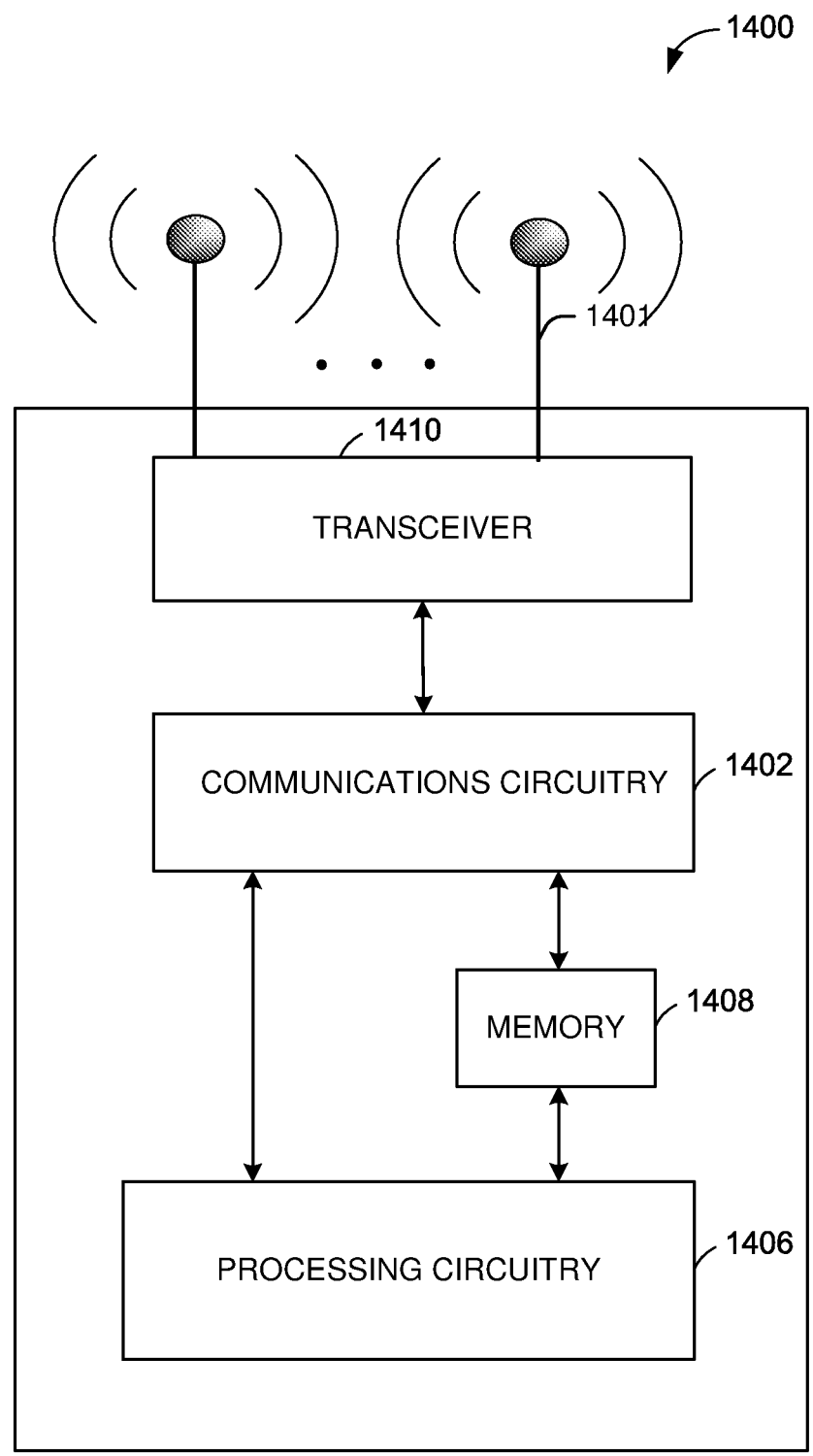
FIG. 14 illustrates a functional diagram of an exemplary communication station that may be suitable for use as a user device, in accordance with one or more example embodiments of the present disclosure.
Figure 15:
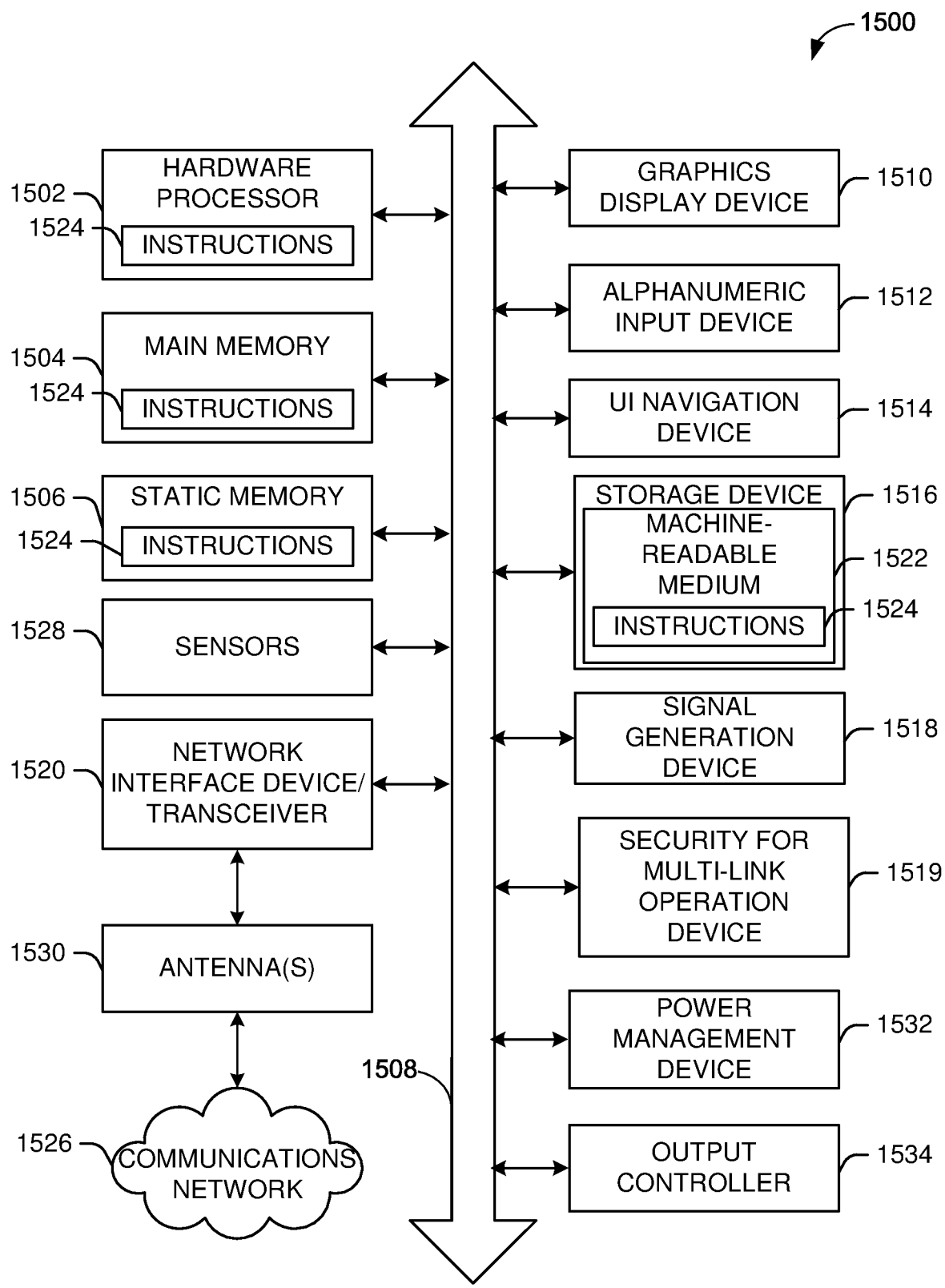
FIG. 15 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 14 and/or the example machine/system of FIG. 15.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11 ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102. For example, one or more APs 102 may implement a security for multi-link operation 142 with one or more user devices 120. It is understood that the above descriptions are for purposes of illustration and are not meant to be limiting.

Figure 2:
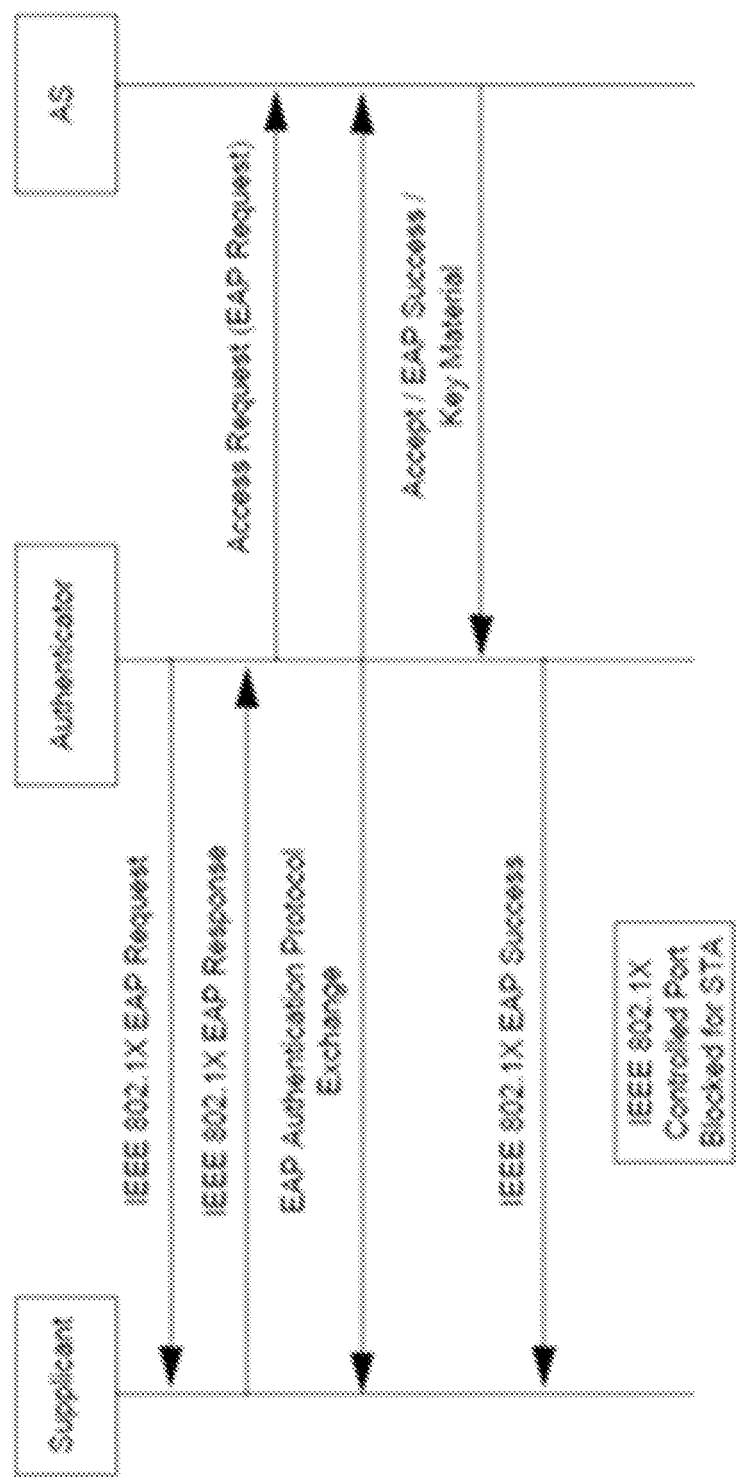
FIG. 2 depicts an illustrative schematic diagram for a pairwise master key (PMK) generation sequence, in accordance with one or more example embodiments of the present disclosure.

FIG. 2 depicts an illustrative schematic diagram for a pairwise master key (PMK) generation sequence, in accordance with one or more example embodiments of the present disclosure.

There are two steps for the robust security network association (RSNA) protocols: step 1 is to generate a PMK. This step uses sequence introduced in FIG. 2 for extensive authentication protocol (EAP) method.

Figure 3:
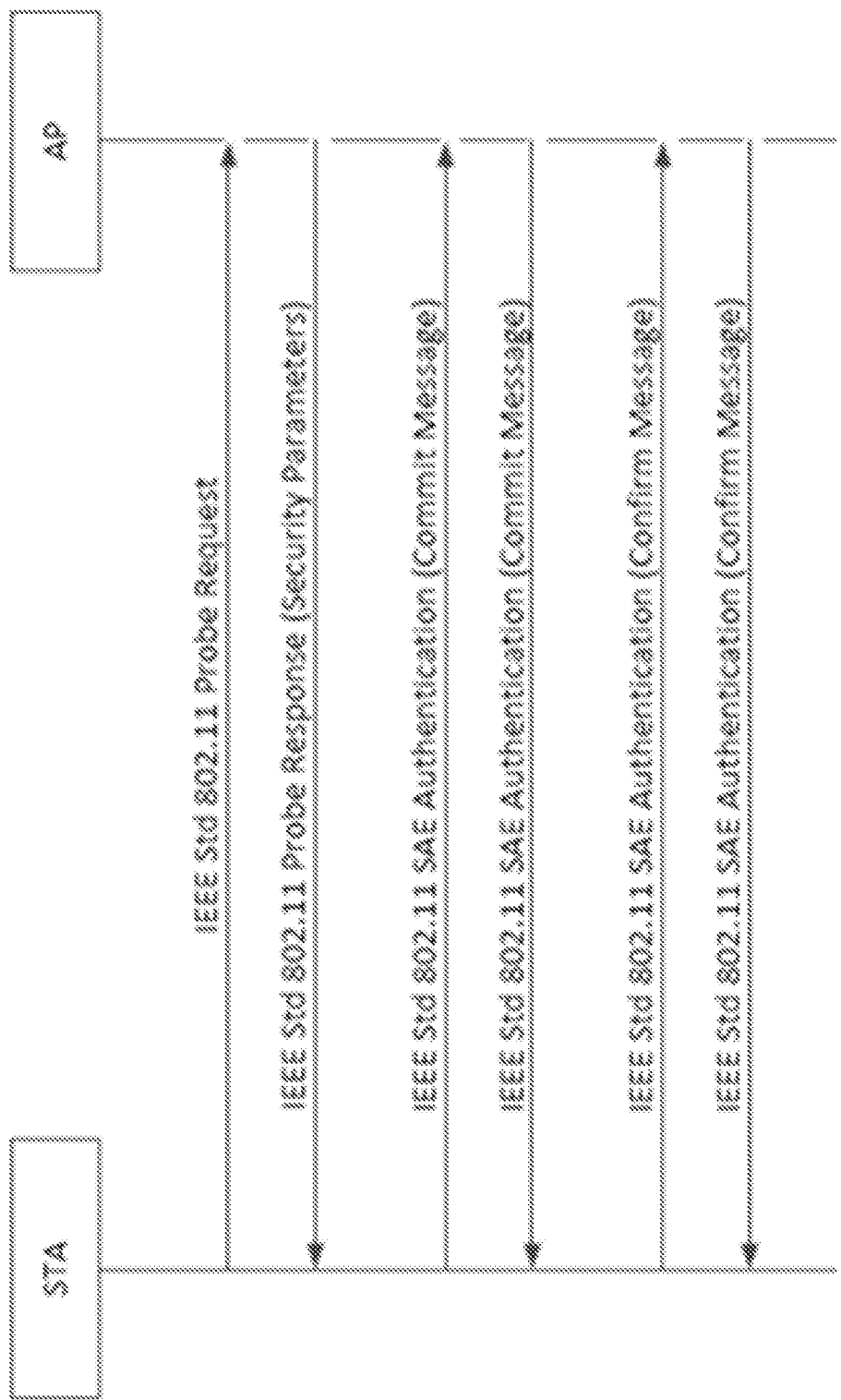
FIG. 3 depicts an illustrative schematic diagram for a pairwise master key (PMK) generation sequence, in accordance with one or more example embodiments of the present disclosure.

FIG. 3 depicts an illustrative schematic diagram for a pairwise master key (PMK) generation sequence, in accordance with one or more example embodiments of the present disclosure.

The PMK may be generated from a password for simultaneous authentication of equals (SAE) method (as in FIG. 3).

Figure 4:
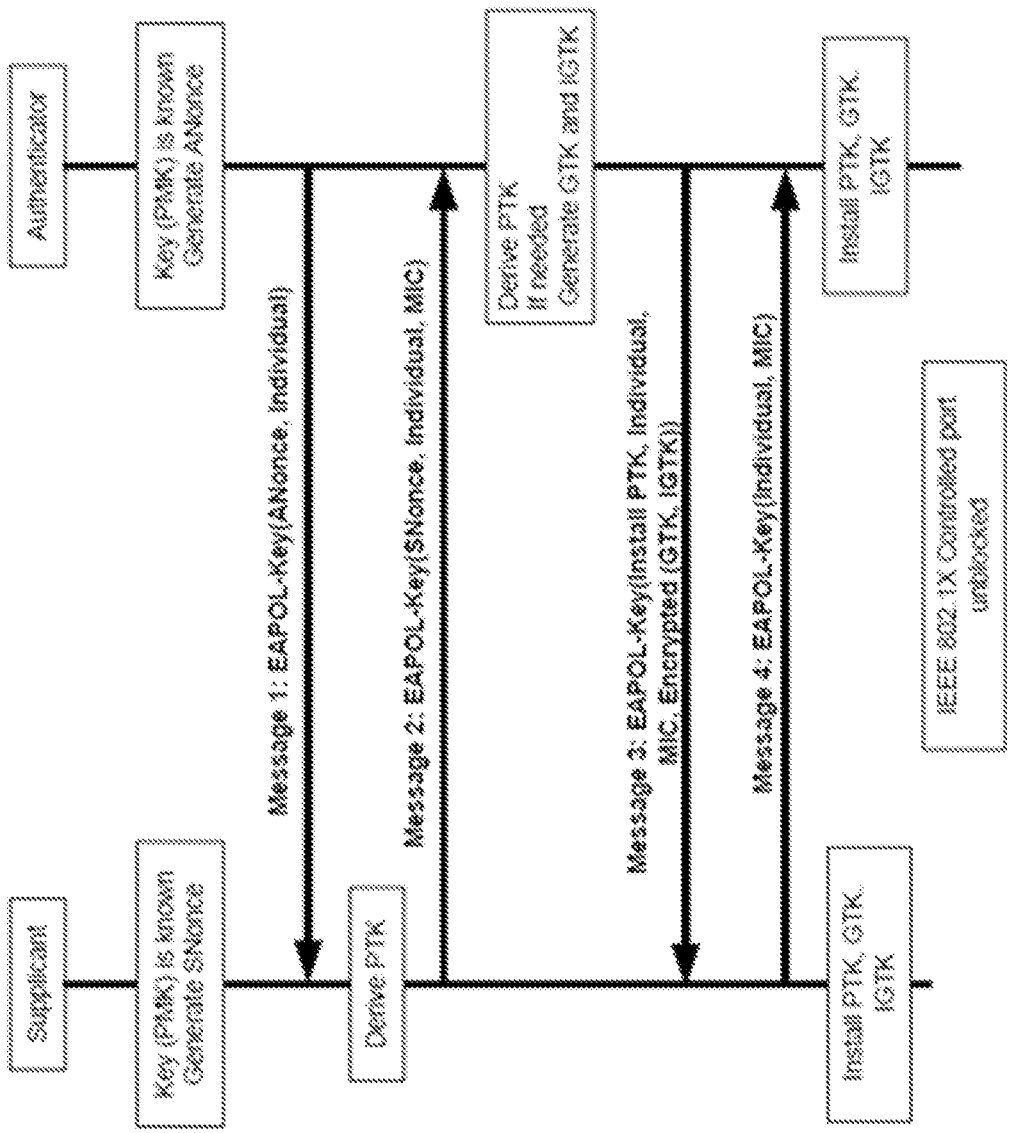
FIG. 4 depicts an illustrative schematic diagram for a pairwise transient key (PTK) generation sequence, in accordance with one or more example embodiments of the present disclosure.

FIG. 4 depicts an illustrative schematic diagram for a pairwise transient key (PTK) generation sequence, in accordance with one or more example embodiments of the present disclosure.

Step 2 is to generate pairwise transient key (PTK), group temporal key (GTK), and integrity group temporal key (IGTK). This step uses the 4-way handshake utilizing extensible authentication protocol (EAP) over LAN (EAPOL-key) frame introduced in FIG. 4.

It should be noted that under infrastructure framework, the authenticator is the access point (AP), and the supplicant is the non-AP station device (STA). It should be understood that in infrastructure framework includes devices communicating through an AP that serves as a bridge to other networks, such as, Internet or LAN.

After a PMK is generated, a PMK security association (PMKSA) is formed, and it includes the information described as follows:

A PMKSA association is bidirectional. In other words, both parties (e.g., STA and AP) use the information in the security association for both sending and receiving. The PMKSA is used to create the PTKSA. PMKSAs have a certain lifetime. The PMKSA consists of the following:
PMKID, which identifies the security association.
Authenticator's or peer's MAC address. For multi-band RSNA, the MAC address is associated with the operating band in use when the PMKSA is established.
PMK.
Lifetime.
AKMP.
All authorization parameters specified by the AS or local configuration. This might include parameters such as the STA's authorized SSID.
Cache Identifier, if advertised by the AP in FILS Indication element.

In one or more embodiments, after a PTK is generated, a PTKSA (PTK security association) is formed, and it includes the following information:
PTK.
Pairwise cipher suite selector.
Supplicant MAC address or STA's MAC address.
Authenticator MAC address or BSSID.
Key ID.
If FT key hierarchy is used, then the following information is included in the PTKSA:
R1KH-ID.
S1KH-ID.
PTKName.

In one or more embodiments, after a GTK is generated, a GTKSA (GTK security association) is formed, and it includes the following information:
Direction vector (whether the GTK is used for transmit or receive).
Group cipher suite selector.
GTK.
Authenticator MAC address.
Key ID.
All authorization parameters specified by local configuration. This might include parameters such as the STA's authorized SSID.

In one or more embodiments, after an IGTK is generated, an IGTKSA (IGTK security association) is formed, and it includes the following information:
Direction vector (whether the IGTK is used for transmit or receive).
Key ID.
IGTK.
Authenticator MAC address.

Figure 5:
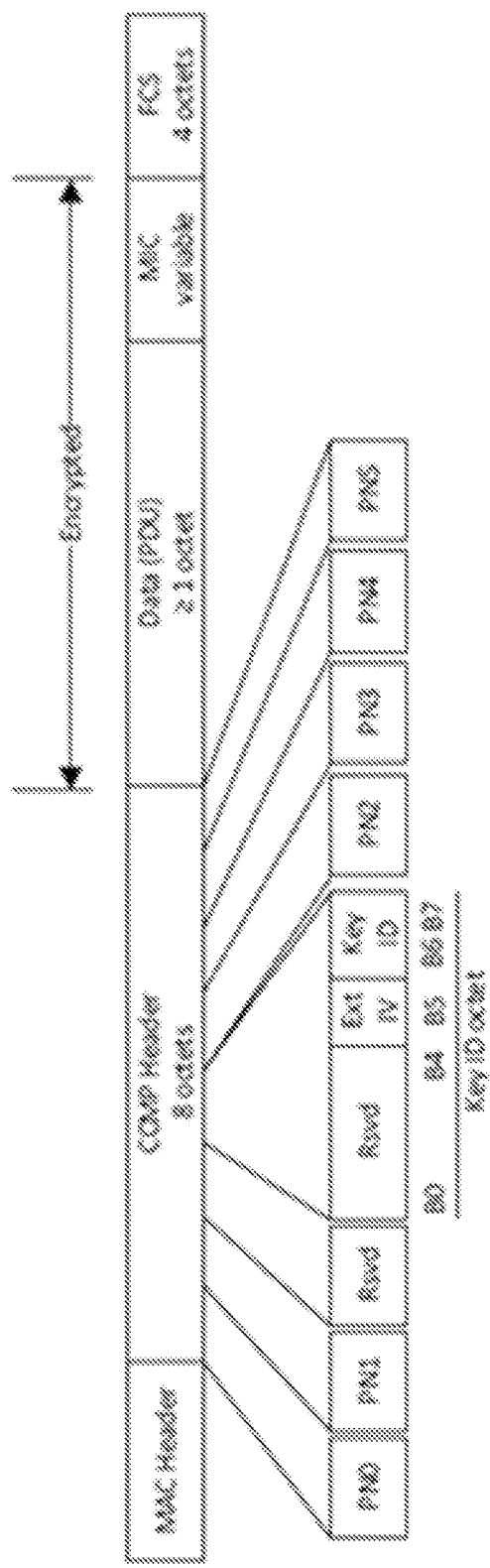
FIG. 5 depicts an illustrative schematic diagram for an expanded counter mode with cipher-block chaining message authentication code protocol (CCMP) MAC protocol data unit (MPDU), in accordance with one or more example embodiments of the present disclosure.

FIG. 5 depicts an illustrative schematic diagram for an expanded counter mode with cipher-block chaining message authentication code protocol (CCMP) MAC protocol data unit (MPDU), in accordance with one or more example embodiments of the present disclosure.

To deal with replay detection for usage of PTK and GTK, a mechanism called PN (packet number) is introduced. With the typical counter mode with cipher-block chaining message authentication code protocol (CCMP) operation, a CCMP header is introduced in the frame as shown in FIG. 5, and a 48-bit PN (PN0 to PN5, each with 8 bits) is used for replay detection.

The replay detection mechanism defines a means by which a station that receives a data or Robust Management Frame from another station can detect whether the received data frame is an unauthorized retransmission. For example, whether the received frame is a replayed transmission or not. This replay protection mechanism is provided for data frames for stations that use the CCMP or TKIP cipher suites. The replay protection mechanism is also provided for robust management frames for stations that use CCMP and the Broadcast/Multicast Integrity Protocol (BIP).

The expanded CCMP MPDU depicts the MPDU when using CCMP.

Typically, there is a single PN space for each PTKSA and GTKSA. For example, the single PN space may be a 48 bit counter for each PTKSA and GTKSA. The PN may be implemented as a 48-bit strictly increasing integer, initialized to 1 when the corresponding temporal key is initialized or refreshed.

In one or more embodiments, the STA discard an MPDU based on PN. There is a replay counter for each PTKSA and GTKSA (step (a)). There can be a separate replay counter for a TID if the STA supports that. The STA may detect replay if a received PN is less than or equal to the current replay counter value. The STA may discard the data frame if a replay is detected. Finally, replay detection is performed after the receiver reordering operation is performed if block acknowledgment usage is used. For example, for MSDUs or A-MSDUs sent using the block ack feature, reordering of received MSDUs or A-MSDUs according to the block ack receiver operation is performed prior to replay detection.

Figure 6:
FIG. 6 depicts an illustrative schematic diagram for an management message integrity code information element (MME), in accordance with one or more example embodiments of the present disclosure.

FIG. 6 depicts an illustrative schematic diagram for a management message integrity code information element (MME), in accordance with one or more example embodiments of the present disclosure.

In one or more embodiments, IGTK replay detection is based on the broadcast/multicast integrity protocol (BIP) protocol. An additional element, called management message integrity code information element (MME), with the calculated MIC is included in the management frame as shown in FIG. 6.

For IGTK, a separate integrity group transient key packet number (IPN) is maintained. When management frame protection is negotiated, the receiver may maintain a 48-bit replay counter for each IGTK. The receiver may set the receive replay counter to the value of the IPN in the IGTK key data encapsulation (KDE) provided by the Authenticator in the 4-way handshake, FT 4-way handshake, FT handshake, group key handshake, or fast initial link setup (FILS) authentication. The transmitter may maintain a single IPN for each IGTK. The IPN may be implemented as a 48-bit strictly increasing integer, initialized to 1 when the corresponding IGTK is initialized. The transmitter may reinitialize the sequence counter when the IGTK is refreshed. For replay detection, the integrity group transient key packet number (IPN) for a Key ID is compared with the received value, and the frame is discarded. That is, if the integer value from the received IPN field is less than or equal to the replay counter value for this IGTK, the receiver shall discard the frame and increment the dot11RSNAStatsCMACReplays counter by 1.

In EHT, the framework of operation is expanded between two STAs (FIG. 4, where one link is established) to operation between two devices, where each device has multiple STAs and one entry point for the upper LLC layer for identification and one MAC data service interface and primitives for upper LLC layer to use.

In one or more embodiments, a security for multi-link operation system may call device 1 multi-link device, this is not limited by the name, it may be called multi-link entity or any other names. The idea is that it includes multiple STAs to do setup for multiple links with the definition provided above.

Figure 7:
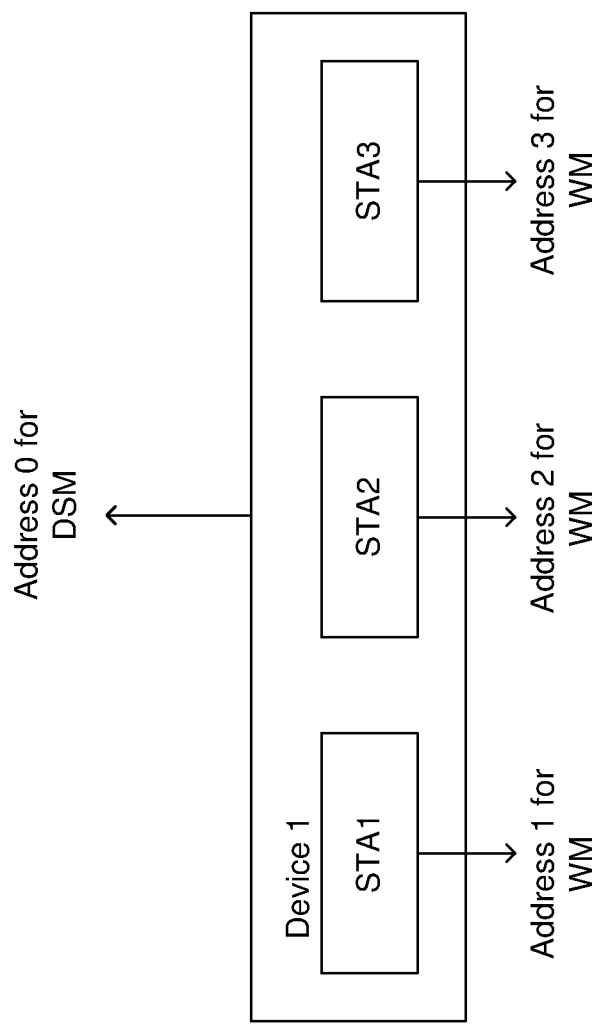
FIG. 7 depicts an illustrative schematic diagram for device addresses, in accordance with one or more example embodiments of the present disclosure.

FIG. 7 depicts an illustrative schematic diagram for device addresses, in accordance with one or more example embodiments of the present disclosure.

In one or more embodiments, each multi-link device will have a MAC data service interface and primitive to logical link control (LLC) specification. As a result, from the LLC point of view, it can request the lower layer to transmit data or get data from the lower layer without having the knowledge of one or multiple links. For routing reason, each multi-link device needs an address to communicate to the distribution system medium (DSM) in order for the packet to be routing in DSM. Note that the address for DSM maybe same or different from the MAC address used in the wireless medium (WM). An example is shown in FIG. 7.

Figure 8:
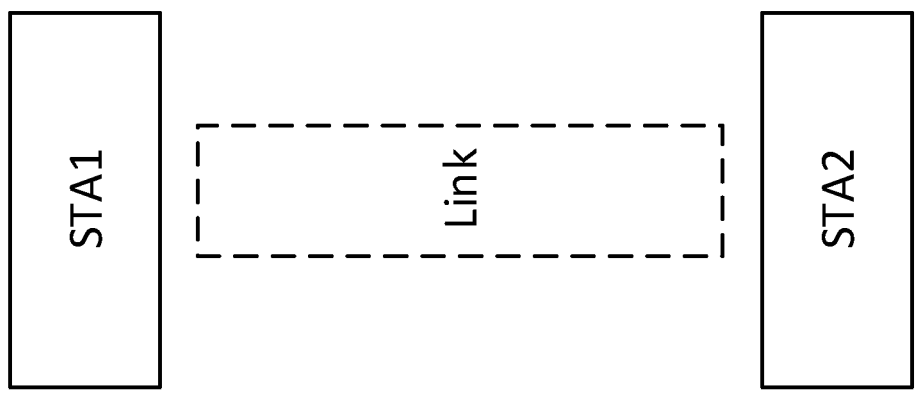
FIGS. 8 and 9 depict illustrative schematic diagrams for one or more links between two devices, in accordance with one or more example embodiments of the present disclosure.
Figure 9:
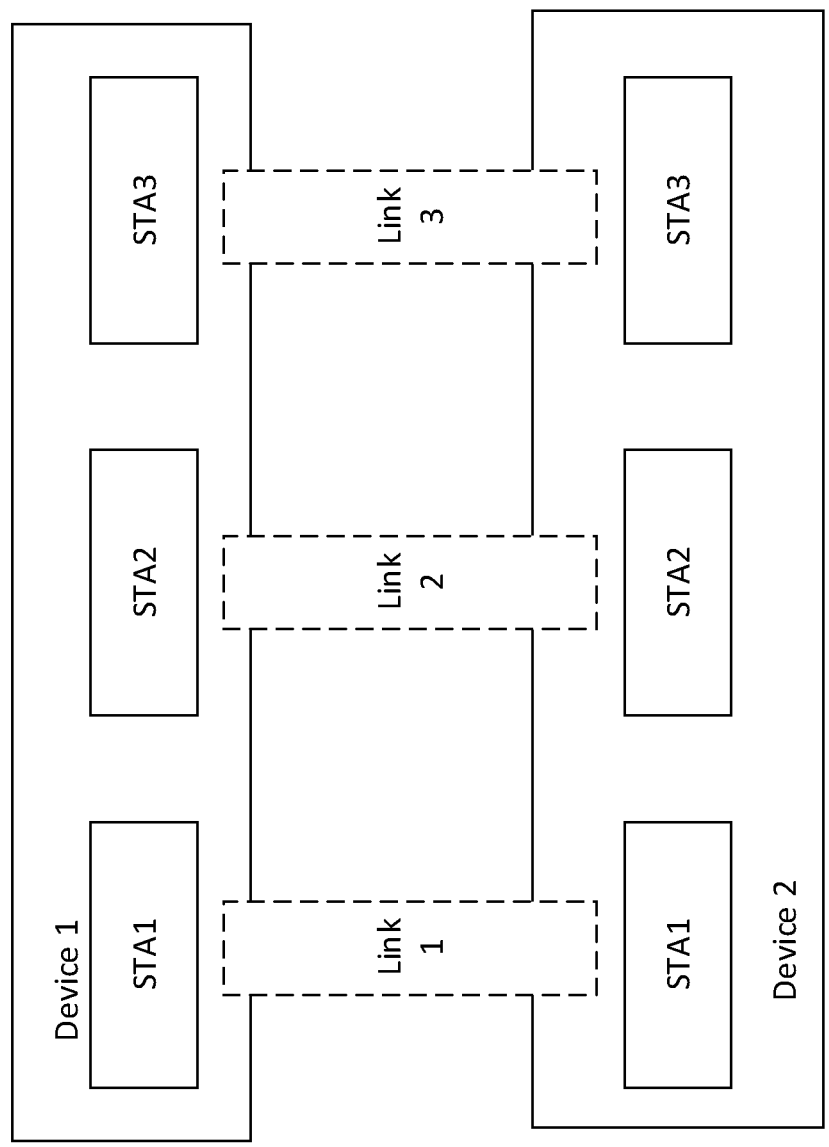

FIGS. 8 and 9 depict illustrative schematic diagrams for one or more links between two devices, in accordance with one or more example embodiments of the present disclosure.

In one or more embodiments, for infrastructure operation, multi-link device 1 can have all of its STAs to be AP, and multi-link device 2 can have all of its STAs to be non-AP.

The following are the definitions of STA and link:

A station (STA) may be a logical entity that is a singly addressable instance of a medium access control (MAC) and physical layer (PHY) interface to the wireless medium (WM).

A link, in the context of an IEEE 802.11 medium access control (MAC) entity, may be a physical path consisting of exactly one traversal of the WN that is usable to transfer MAC service data units (MSDUs) between two stations (STAs). Some examples are shown in FIG. 8 and FIG. 9.

In the following, it is assumed that multi-link device 1 has STAs to be AP (multi-link AP device) and multi-link device 2 has STAs to be non-AP STA (multi-link non-AP device).

In one or more embodiments, a security for multi-link operation system may facilitate to have same PMK/PMKSA between two multi-link devices (device 1 and device 2).

In one or more embodiments, when the extensive authentication protocol (EAP) method is used, the authenticator address for the PMKSA is the device address of multi-link device 1. Also, the supplicant address for the PMKSA is the device address of multi-link device 2. The PMKID can then be computed uniquely based on the authenticator address or supplicant address.

In one or more embodiments, when SAE is used, the MAC address on both sides (STA-A-MAC and STA-B-MAC) will be replaced by device address of multi-link device 1 and device address of multi-link device 2. Also, if STA-A is multi-link device 1, then replace STA-A-MAC with device address of multi-link device 1 and replace STA-B-MAC with device address of multi-link device 2. And, if STA-A is multi-link device 2, then replace STA-A-MAC with device address of multi-link device 2 and replace STA-B-MAC with device address of multi-link device 1.

In one or more embodiments, a security for multi-link operation system may let both side know the device address. The device address will be conveyed through the air to generate pairwise master key (PMK) (e.g., SAE setup or EAP method). This can be indicated in a new element created for the multi-link operation.

In one or more embodiments, the peer's MAC address for the PMKSA is the device address of multi-link device on the other end. The same PMK is used for the key hierarchy across the links.

In one or more embodiments, there may be various options of PTK, GTK, and IGTK. For PTK/PTKSA in option 1, where there is same PTKSA/PTK across links. To enable this option under different WM address, it is proposed to put the authenticator address as the device address of multi-link device 1 and the supplicant address as the device address of multi-link device 2. For the same or different MAC address on WM, to alleviate PN racing, which is the tight requirement for the transmitter to assign PN across links under aggregation (if PN assignment is in lower level), a security for multi-link operation system may allow the transmitter to use different range of PN for different links. For example, transmitter use range 1 to $2^{24}$ for link 1 and $2^{24}+1$ to $2^{48}$ for link 2.

In one or more embodiments, for the same or different MAC address on WM, enable per-link replay counter to detect replay. This can be a requirement when aggregation is used between multi-link device 1 and multi-link device 2.

The replay detection is then based on the reception on each link, if MAC address on the WM of different links is the same, the replay detection will be based on link configuration of the transmission in additional to the TA address. This assumes that there is no overlapping link configuration for primary channel.

Figure 10:
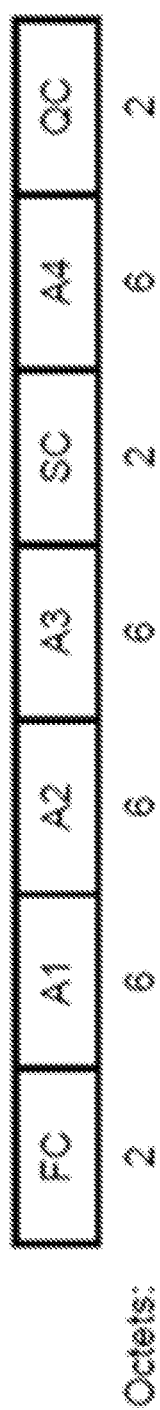
FIG. 10 depicts an illustrative schematic diagram for additional authentication data (AAD) definition, in accordance with one or more example embodiments of the present disclosure.

FIG. 10 depicts an illustrative schematic diagram for additional authentication data (AAD) definition, in accordance with one or more example embodiments of the present disclosure.

In one or more embodiments, for different MAC addresses on WM, the definition of AAD may be changed by using transmitter device address for A2 and receiver device address for A1.

The BSSID used is also replaced with the device address of the multi-link device 1 with STAs as AP. As a result, there is no need for re-encrypting the frame when retransmitting the frame in different links or enabling unifying encryption among all the links. A Multi-link device can have a capability bit to indicate if changing AAD is supported. The current AAD definition is shown in FIG. 10.

For different MAC addresses on the WM, the definition of CCM nonce may be changed by using transmitter device address for A2.

As a result, there is no need for re-encrypting the frame when retransmitting the frame in different links or enabling unifying encryption among all the links.

Figure 11:
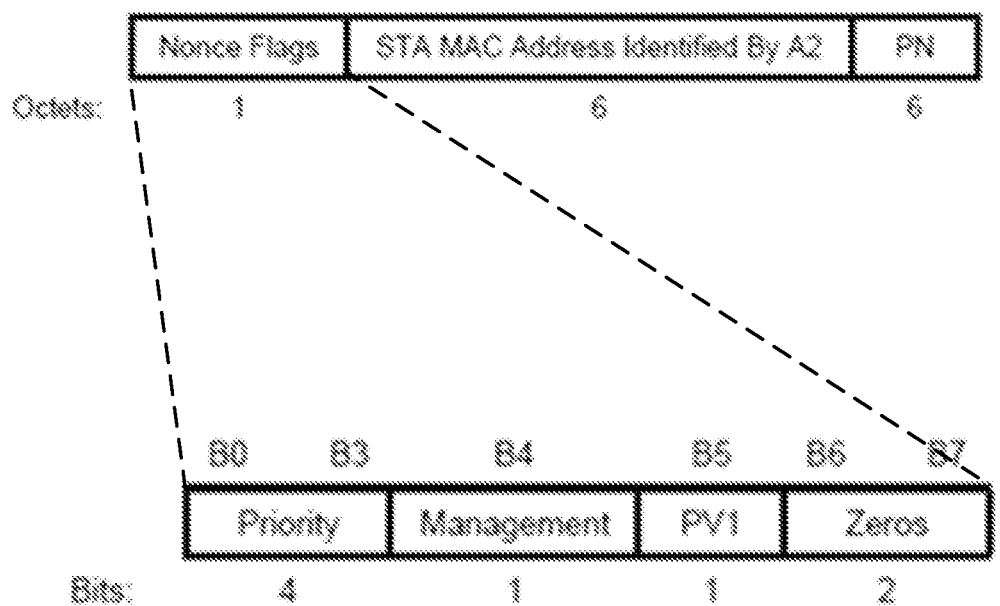
FIG. 11 depicts an illustrative schematic diagram for counter mode with cipher-block chaining medium access control (CCM) nonce definition, in accordance with one or more example embodiments of the present disclosure.

FIG. 11 depicts an illustrative schematic diagram for counter mode with cipher-block chaining medium access control (CCM) nonce definition, in accordance with one or more example embodiments of the present disclosure.

Multi-link device can have a capability bit to indicate if changing CCM nonce is supported. The current CCM nonce definition is shown in FIG. 11.

Referring to FIG. 11, there is shown that a nonce field occupies 13 octets, and structure is shown to include a nonce flags subfield. The nonce flags subfield would be comprised of eight bits. The nonce flags subfield would include a priority field, a management field, a protocol version field, and one or more zeros.

In one or more embodiments, option 2 may be when different PTKSA/PTK are used across links. To enable this option under same WM address across links, based on the operation below for PTK computation, it is proposed to have different ANonce (authenticator nonce) and SNonce (supplicant nonce) across links.

$PTK=PRF$-Length($PMK$,"Painvise key expansion",
Min($AA,SPA$)∥Max($AA,SPA$)∥Min(ANonce,SNonce)∥Max(ANonce,Snonce))

To enable this option under same WM address across links, another identifier (for example, link identifier) may be added in the PTASA context to differentiate the context in different links. To enable negotiation of different PTK/PTKSA across links in one exchange:

Information of different links can be put in the EAPOL-key frame to enable negotiation of different PTK/PTKSA.

In one or more embodiments, option 3 may be a mix of option 1 and option 2. Some links will use option 1 with mechanism as described above. Some links will use option 2 with mechanism as described above.

In one or more embodiments, a Multi-link device can have a capability bit to indicate if option 1 or option 2 or both is supported.

For GTK/GTKSA:

Option 1, where the same GTKSA/GTK are used across links. To enable this under different MAC address, it is proposed to put the authenticator address as the device address of multi-link device 1.

$GTK=PFK$-Length($GMK$,"Group key expansion".
$AA$∥GNonce)

For the same or different MAC address on WM, to alleviate PN racing, which is the tight requirement for the transmitter to assign PN across links, it is proposed that the following:

Allow the transmitter to use different range of PN for different links. For example, transmitter use range 1 to 2^24 for link 1 and 2^24+1 to 2^48 for link 2.

For the same or different MAC address on WM, enable per-link replay counter to detect replay. The replay detection is then based on the reception on each link, if MAC address on the WM of different links is the same, the replay detection will be based on link configuration of the transmission in additional to the TA address. This assumes that there is no overlapping link configuration for primary channel.

For the same or different MAC address on WM, current PN value of different link can be provided in the group key handshake. Note, that currently, only one current PN value is provided. The signaling is provided with per link key RSC.

For different MAC addresses on WM, the definition of AAD may be changed by using transmitter device address for A2 and receiver device address for A1. The BSSID used in A3 or A4 is also replaced with the device address of the multi-link device 1 with STAs as AP (multi-link AP device). As a result, there is no need for re-encrypting the frame when retransmitting the frame in different links or enabling unifying encryption among all the links.

The current AAD definition is shown in FIG. 10.

For different MAC addresses on WM, the definition of CCM nonce may be changed by using transmitter device address for A2. As a result, there is no need for re-encrypting the frame when retransmitting the frame in different links or enabling unifying encryption among all the links. The current CCM nonce definition is shown in FIG. 11.

Option 2: different GTKSA/GTK across links.

To enable this option under same WM address across links, based on the operation below for GTK computation. It is proposed to have different GNonce (group nonce) across links.

$GTK=PRF$-Length($GMK$,"Group key expansion",
$AA$∥GNonce) c)

To enable negotiation of different GTK/GTKSA across links in one exchange:

Information of different links can be put in the EAPOL-key frame to enable negotiation of different GTK/GTKSA.

Option 3: mixed of option 1 and option 2

Some links will use option 1 with mechanism as described above.

Some links will use option 2 with mechanism as described above.

Multi-link non-AP device can also have rules to take broadcast/multicast group addressed frame using GTK in a specific link at one time rather than all the links.

This specific link may be changed through an additional mechanism:

For IGTK/IGTKSA:

Option 1: same IGTKSA/IGTK across links. To enable this under different MAC address, it is proposed to put the authenticator address as the device address of multi-link device 1.

For the same or different MAC address on WM, to alleviate PN racing, which is the tight requirement for the transmitter to assign IPN across links, it is proposed to allow the transmitter to use different range of IPN for different links. For example, transmitter use range 1 to 2^24 for link 1 and 2^24+1 to 2^48 for link 2.

For the same or different MAC address on WM, enable per-link replay counter to detect replay. The replay detection is then based on the reception on each link, if MAC address on the WM of different links is the same, the replay detection will be based on link configuration of the transmission in additional to the TA address. This assumes that there is no overlapping link configuration for primary channel.

For the same or different MAC address on WM, current integrity group transient key packet number (IPN) value of different link can be provided in the IGTK key handshake.

Note that currently, only one current IPN value is provided. The signaling is provided with IGTK key data encapsulation (KDE). A multi-link IGTK KDE can be developed for this purpose.

Figure 12:
FIG. 12 depicts an illustrative schematic diagram for additional authentication data (AAD) definition for broadcast/multicast integrity protocol (BIP), in accordance with one or more example embodiments of the present disclosure.

FIG. 12 depicts an illustrative schematic diagram for additional authentication data (AAD) definition for broadcast/multicast integrity protocol (BIP), in accordance with one or more example embodiments of the present disclosure.

For different MAC addresses on WM, the definition of AAD may be changed by using transmitter device address for A2 and receiver device address for A1. The BSSID used in A3 is also replaced with the device address of the multi-link device 1 with STAs as AP (multi-link AP device). The current additional authentication data (AAD) definition for BIP is shown in FIG. 12.

Option 2: different IGTKSA/IGTK across links: to enable negotiation of different GTK/GTKSA across links in one exchange, information of different links can be put in the EAPOL-key frame to enable negotiation of different IGTK/IGTKSA.

Option 3 may be a mix of option 1 and option 2. In that case, some links will use option 1 with mechanism as described above. Some links will use option 2 with mechanism as described above.

In one or more embodiments, a Multi-link non-AP device may also have rules to take protected management frame using IGTK in a specific link at one time rather than all the links. This specific link may be changed through an additional mechanism. It is understood that the above descriptions are for purposes of illustration and are not meant to be limiting.

Figure 13:
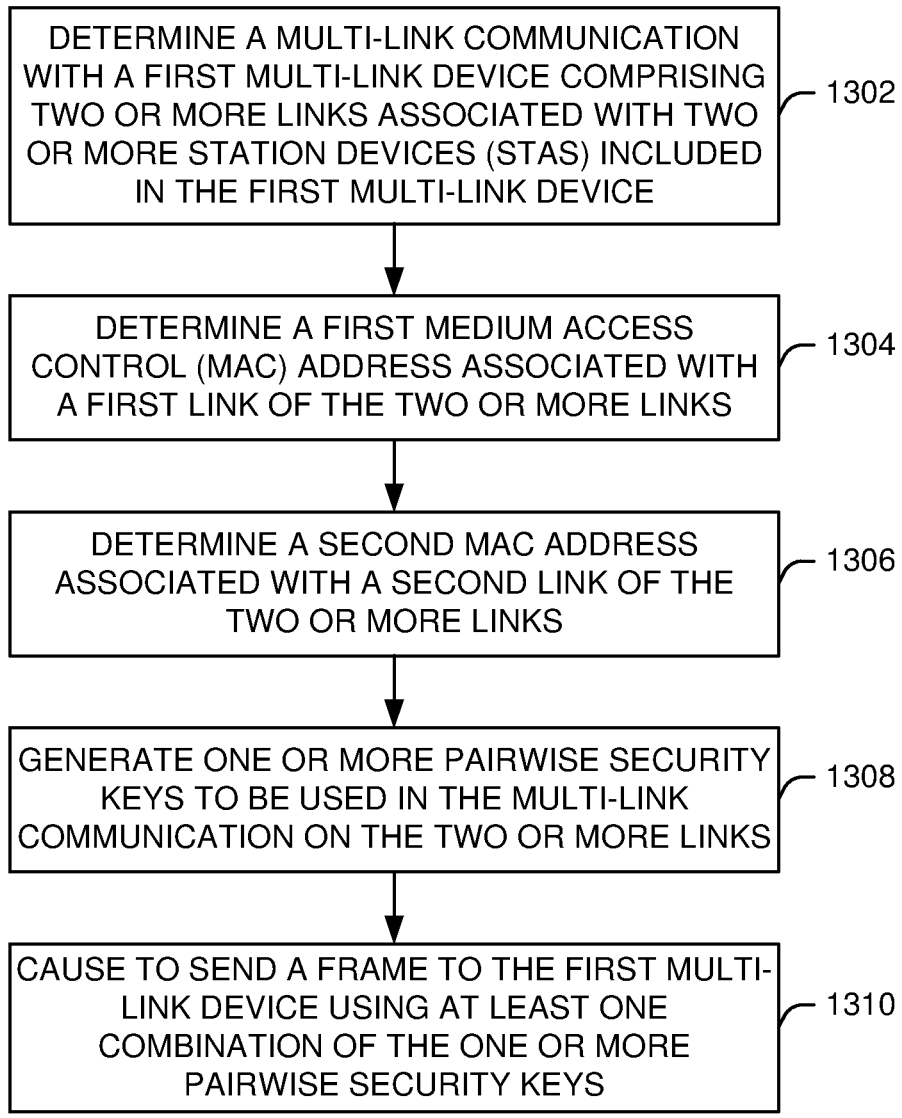
FIG. 13 illustrates a flow diagram of illustrative process for an illustrative security for multi-link operation system, in accordance with one or more example embodiments of the present disclosure.

FIG. 13 illustrates a flow diagram of illustrative process 1300 for a security for multi-link operation system, in accordance with one or more example embodiments of the present disclosure.

At block 1302, a device (e.g., the user device(s) 120 and/or the AP 102 of FIG. 1) may determine a multi-link communication with a first multi-link device comprising two or more links associated with two or more station devices (STAs) included in the first multi-link device.

At block 1304, the device may determine a first medium access control (MAC) address associated with a first link of the two or more links.

At block 1306, the device may determine a second MAC address associated with a second link of the two or more links.

At block 1308, the device may generate one or more pairwise security keys to be used in the multi-link communication on the two or more links.

At block 1310, the device may cause to send a frame to the first multi-link device using at least one combination of the one or more pairwise security keys.

It is understood that the above descriptions are for purposes of illustration and are not meant to be limiting.

FIG. 14 shows a functional diagram of an exemplary communication station 1400, in accordance with one or more example embodiments of the present disclosure. In one embodiment, FIG. 14 illustrates a functional block diagram of a communication station that may be suitable for use as an AP 102 (FIG. 1) or a user device 120 (FIG. 1) in accordance with some embodiments. The communication station 1400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1400 may include communications circuitry 1402 and a transceiver 1410 for transmitting and receiving signals to and from other communication stations using one or more antennas 1401. The communications circuitry 1402 may include circuitry that can operate the physical layer (PHY) communications and/or medium access control (MAC) communications for controlling access to the wireless medium, and/or any other communications layers for transmitting and receiving signals. The communication station 1400 may also include processing circuitry 1406 and memory 1408 arranged to perform the operations described herein. In some embodiments, the communications circuitry 1402 and the processing circuitry 1406 may be configured to perform operations detailed in the above figures, diagrams, and flows.

In accordance with some embodiments, the communications circuitry 1402 may be arranged to contend for a wireless medium and configure frames or packets for communicating over the wireless medium. The communications circuitry 1402 may be arranged to transmit and receive signals. The communications circuitry 1402 may also include circuitry for modulation/demodulation, upconversion/downconversion, filtering, amplification, etc. In some embodiments, the processing circuitry 1406 of the communication station 1400 may include one or more processors. In other embodiments, two or more antennas 1401 may be coupled to the communications circuitry 1402 arranged for sending and receiving signals. The memory 1408 may store information for configuring the processing circuitry 1406 to perform operations for configuring and transmitting message frames and performing the various operations described herein. The memory 1408 may include any type of memory, including non-transitory memory, for storing information in a form readable by a machine (e.g., a computer). For example, the memory 1408 may include a computer-readable storage device, read-only memory (ROM), random-access memory (RAM), magnetic disk storage media, optical storage media, flash-memory devices and other storage devices and media.

In some embodiments, the communication station 1400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1400 may include one or more antennas 1401. The antennas 1401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1400 may include one or more of a keyboard, a display, a non-volatile memory port, multiple antennas, a graphics processor, an application processor, speakers, and other mobile device elements. The display may be an LCD screen including a touch screen.

Although the communication station 1400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1400 may include one or more processors and may be configured with instructions stored on a computer-readable storage device.

FIG. 15 illustrates a block diagram of an example of a machine 1500 or system upon which any one or more of the techniques (e.g., methodologies) discussed herein may be performed. In other embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environments. The machine 1500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a power management device 1532, a graphics display device 1510, an alphanumeric input device 1512 (e.g., a keyboard), and a user interface (UI) navigation device 1514 (e.g., a mouse). In an example, the graphics display device 1510, alphanumeric input device 1512, and UI navigation device 1514 may be a touch screen display. The machine 1500 may additionally include a storage device (i.e., drive unit) 1516, a signal generation device 1518 (e.g., a speaker), a security for multi-link operation device 1519, a network interface device/transceiver 1520 coupled to antenna(s) 1530, and one or more sensors 1528, such as a global positioning system (GPS) sensor, a compass, an accelerometer, or other sensor. The machine 1500 may include an output controller 1534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1502 for generation and processing of the baseband signals and for controlling operations of the main memory 1504, the storage device 1516, and/or the security for multi-link operation device 1519. The baseband processor may be provided on a single radio card, a single chip, or an integrated circuit (IC).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within the static memory 1506, or within the hardware processor 1502 during execution thereof by the machine 1500. In an example, one or any combination of the hardware processor 1502, the main memory 1504, the static memory 1506, or the storage device 1516 may constitute machine-readable media.

The security for multi-link operation device 1519 may carry out or perform any of the operations and processes (e.g., process 1300) described and shown above.

It is understood that the above are only a subset of what the security for multi-link operation device 1519 may be configured to perform and that other functions included throughout this disclosure may also be performed by the security for multi-link operation device 1519.

While the machine-readable medium 1522 is illustrated as a single medium, the term "machine-readable medium" may include a single medium or multiple media (e.g., a centralized or distributed database, and/or associated caches and servers) configured to store the one or more instructions 1524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1500 and that cause the machine 1500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device/transceiver 1520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1520 may include one or more physical jacks (e.g., Ethernet, coaxial, or phone jacks) or one or more antennas to connect to the communications network 1526. In an example, the network interface device/transceiver 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 16:
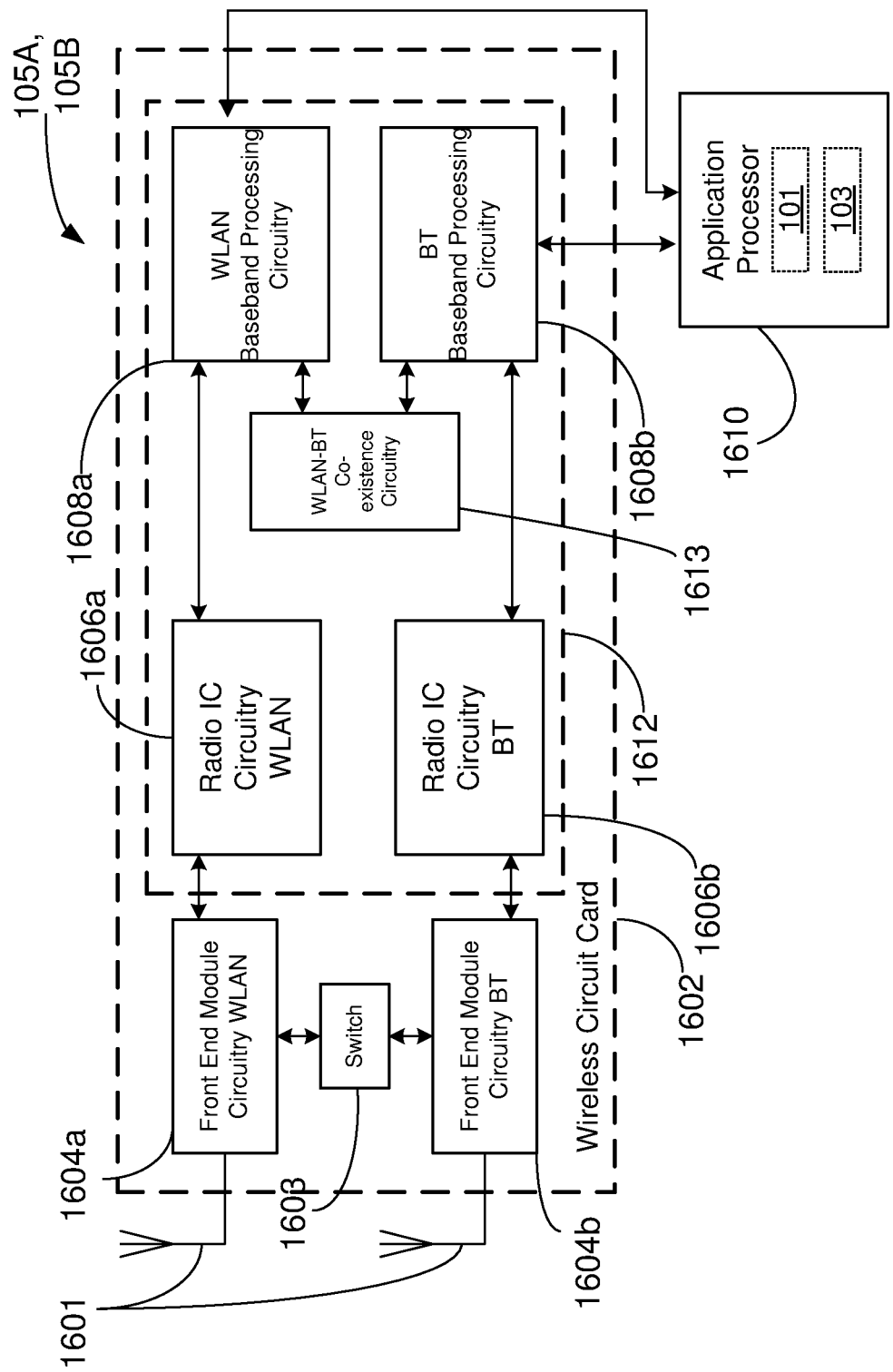
FIG. 16 is a block diagram of a radio architecture in accordance with some examples.

FIG. 16 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 1604a-b, radio IC circuitry 1606a-b and baseband processing circuitry 1608a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1604a-b may include a WLAN or Wi-Fi FEM circuitry 1604a and a Bluetooth (BT) FEM circuitry 1604b. The WLAN FEM circuitry 1604a may include a receive signal path comprising circuitry configured to operate on WLAN RF signals received from one or more antennas 1601, to amplify the received signals and to provide the amplified versions of the received signals to the WLAN radio IC circuitry 1606a for further processing. The BT FEM circuitry 1604b may include a receive signal path which may include circuitry configured to operate on BT RF signals received from one or more antennas 1601, to amplify the received signals and to provide the amplified versions of the received signals to the BT radio IC circuitry 1606b for further processing. FEM circuitry 1604a may also include a transmit signal path which may include circuitry configured to amplify WLAN signals provided by the radio IC circuitry 1606a for wireless transmission by one or more of the antennas 1601. In addition, FEM circuitry 1604b may also include a transmit signal path which may include circuitry configured to amplify BT signals provided by the radio IC circuitry 1606b for wireless transmission by the one or more antennas. In the embodiment of FIG. 16, although FEM 1604a and FEM 1604b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1606a-b as shown may include WLAN radio IC circuitry 1606a and BT radio IC circuitry 1606b. The WLAN radio IC circuitry 1606a may include a receive signal path which may include circuitry to down-convert WLAN RF signals received from the FEM circuitry 1604a and provide baseband signals to WLAN baseband processing circuitry 1608a. BT radio IC circuitry 1606b may in turn include a receive signal path which may include circuitry to down-convert BT RF signals received from the FEM circuitry 1604b and provide baseband signals to BT baseband processing circuitry 1608b. WLAN radio IC circuitry 1606a may also include a transmit signal path which may include circuitry to up-convert WLAN baseband signals provided by the WLAN baseband processing circuitry 1608a and provide WLAN RF output signals to the FEM circuitry 1604a for subsequent wireless transmission by the one or more antennas 1601. BT radio IC circuitry 1606b may also include a transmit signal path which may include circuitry to up-convert BT baseband signals provided by the BT baseband processing circuitry 1608b and provide BT RF output signals to the FEM circuitry 1604b for subsequent wireless transmission by the one or more antennas 1601. In the embodiment of FIG. 16, although radio IC circuitries 1606a and 1606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1608a-b may include a WLAN baseband processing circuitry 1608a and a BT baseband processing circuitry 1608b. The WLAN baseband processing circuitry 1608a may include a memory, such as, for example, a set of RAM arrays in a Fast Fourier Transform or Inverse Fast Fourier Transform block (not shown) of the WLAN baseband processing circuitry 1608a. Each of the WLAN baseband circuitry 1608a and the BT baseband circuitry 1608b may further include one or more processors and control logic to process the signals received from the corresponding WLAN or BT receive signal path of the radio IC circuitry 1606a-b, and to also generate corresponding WLAN or BT baseband signals for the transmit signal path of the radio IC circuitry 1606a-b. Each of the baseband processing circuitries 1608a and 1608b may further include physical layer (PHY) and medium access control layer (MAC) circuitry, and may further interface with a device for generation and processing of the baseband signals and for controlling operations of the radio IC circuitry 1606a-b.

Referring still to FIG. 16, according to the shown embodiment, WLAN-BT coexistence circuitry 1613 may include logic providing an interface between the WLAN baseband circuitry 1608a and the BT baseband circuitry 1608b to enable use cases requiring WLAN and BT coexistence. In addition, a switch 1603 may be provided between the WLAN FEM circuitry 1604a and the BT FEM circuitry 1604b to allow switching between the WLAN and BT radios according to application needs. In addition, although the antennas 1601 are depicted as being respectively connected to the WLAN FEM circuitry 1604a and the BT FEM circuitry 1604b, embodiments include within their scope the sharing of one or more antennas as between the WLAN and BT FEMs, or the provision of more than one antenna connected to each of FEM 1604a or 1604b.

In some embodiments, the front-end module circuitry 1604a-b, the radio IC circuitry 1606a-b, and baseband processing circuitry 1608a-b may be provided on a single radio card, such as wireless radio card 1602. In some other embodiments, the one or more antennas 1601, the FEM circuitry 1604a-b and the radio IC circuitry 1606a-b may be provided on a single radio card. In some other embodiments, the radio IC circuitry 1606a-b and the baseband processing circuitry 1608a-b may be provided on a single chip or integrated circuit (IC), such as IC 1612.

In some embodiments, the wireless radio card 1602 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 17:
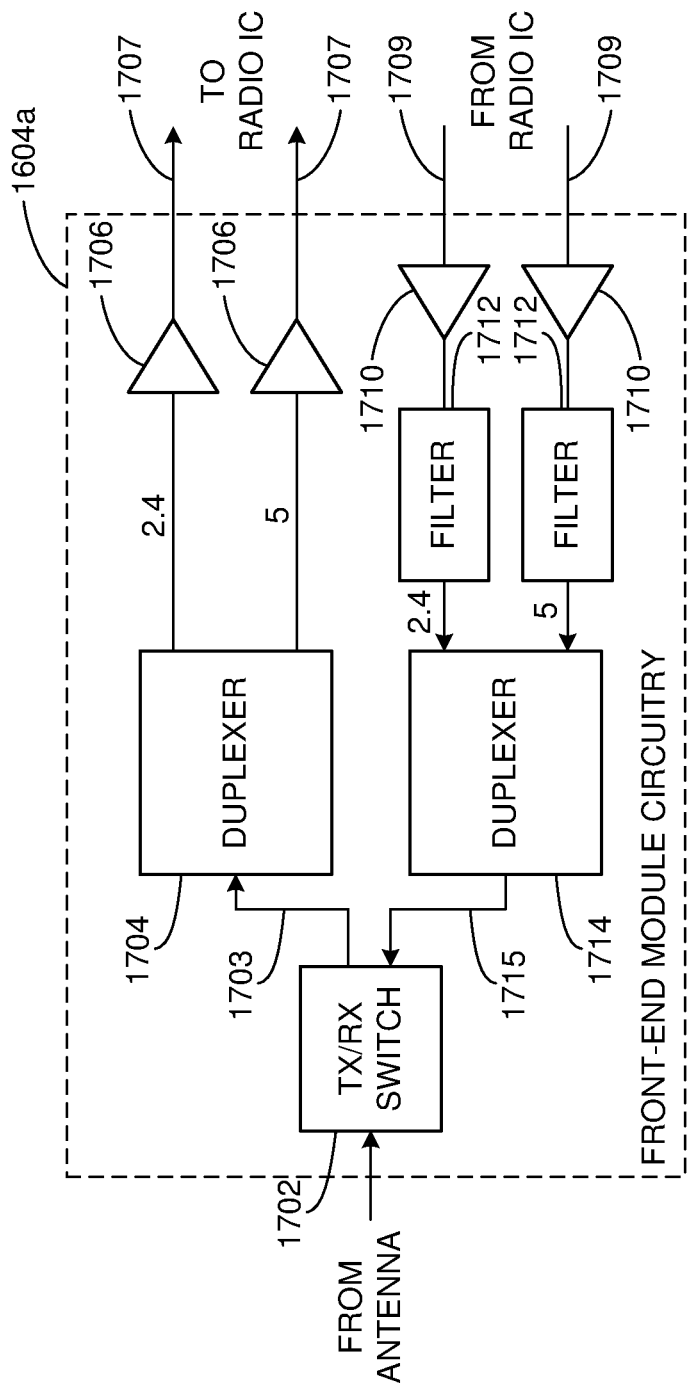
FIG. 17 illustrates an example front-end module circuitry for use in the radio architecture of FIG. 16, in accordance with one or more example embodiments of the present disclosure.

FIG. 17 illustrates WLAN FEM circuitry 1604a in accordance with some embodiments. Although the example of FIG. 17 is described in conjunction with the WLAN FEM circuitry 1604a, the example of FIG. 17 may be described in conjunction with the example BT FEM circuitry 1604b (FIG. 16), although other circuitry configurations may also be suitable.

In some embodiments, the FEM circuitry 1604a may include a TX/RX switch 1702 to switch between transmit mode and receive mode operation. The FEM circuitry 1604a may include a receive signal path and a transmit signal path. The receive signal path of the FEM circuitry 1604a may include a low-noise amplifier (LNA) 1706 to amplify received RF signals 1703 and provide the amplified received RF signals 1707 as an output (e.g., to the radio IC circuitry 1606a-b (FIG. 16)). The transmit signal path of the circuitry 1604a may include a power amplifier (PA) to amplify input RF signals 1709 (e.g., provided by the radio IC circuitry 1606a-b), and one or more filters 1712, such as band-pass filters (BPFs), low-pass filters (LPFs) or other types of filters, to generate RF signals 1715 for subsequent transmission (e.g., by one or more of the antennas 1601 (FIG. 16)) via an example duplexer 1714.

In some dual-mode embodiments for Wi-Fi communication, the FEM circuitry 1604a may be configured to operate in either the 2.4 GHz frequency spectrum or the 5 GHz frequency spectrum. In these embodiments, the receive signal path of the FEM circuitry 1604a may include a receive signal path duplexer 1704 to separate the signals from each spectrum as well as provide a separate LNA 1706 for each spectrum as shown. In these embodiments, the transmit signal path of the FEM circuitry 1604a may also include a power amplifier 1710 and a filter 1712, such as a BPF, an LPF or another type of filter for each frequency spectrum and a transmit signal path duplexer 1704 to provide the signals of one of the different spectrums onto a single transmit path for subsequent transmission by the one or more of the antennas 1601 (FIG. 16). In some embodiments, BT communications may utilize the 2.4 GHz signal paths and may utilize the same FEM circuitry 1604a as the one used for WLAN communications.

Figure 18:
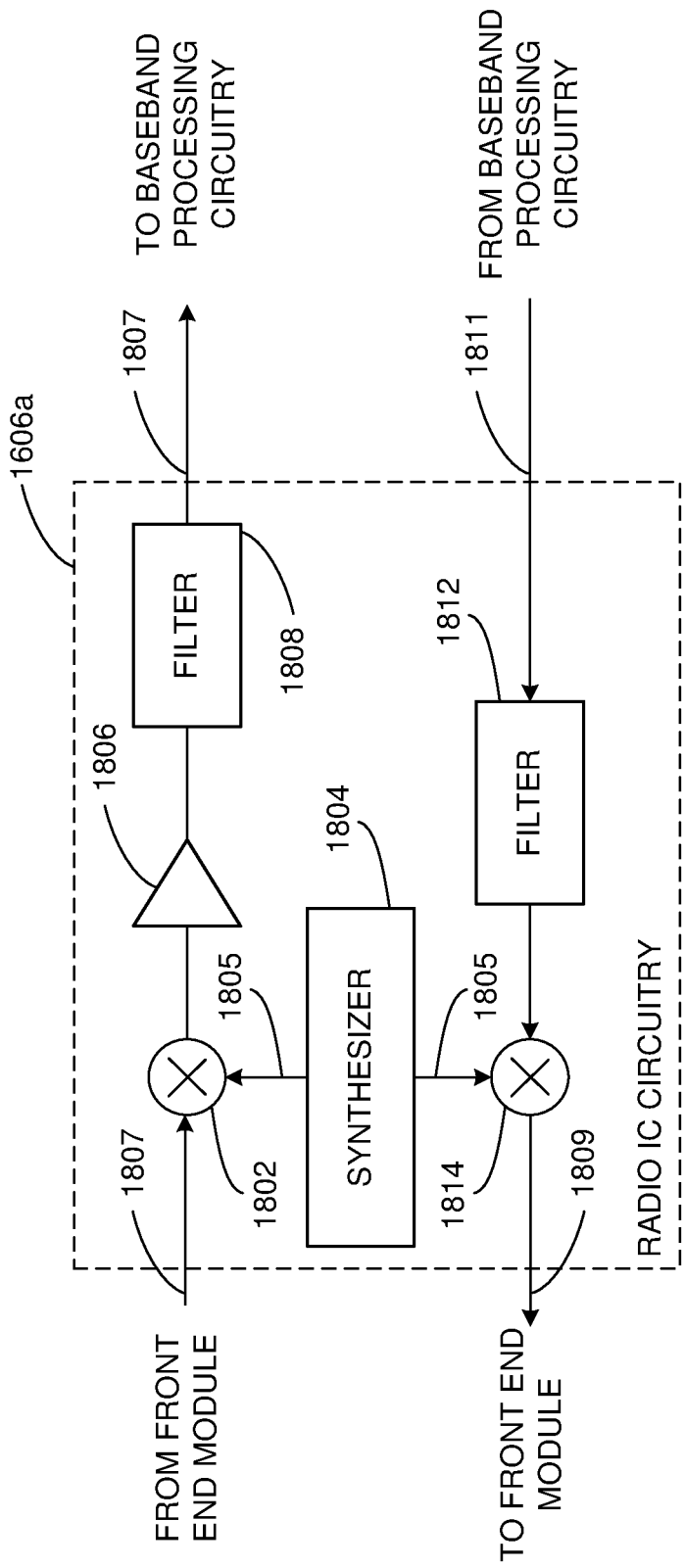
FIG. 18 illustrates an example radio IC circuitry for use in the radio architecture of FIG. 16, in accordance with one or more example embodiments of the present disclosure.

FIG. 18 illustrates radio IC circuitry 1606a in accordance with some embodiments. The radio IC circuitry 1606a is one example of circuitry that may be suitable for use as the WLAN or BT radio IC circuitry 1606a/1606b (FIG. 16), although other circuitry configurations may also be suitable. Alternatively, the example of FIG. 18 may be described in conjunction with the example BT radio IC circuitry 1606b.

In some embodiments, the radio IC circuitry 1606a may include a receive signal path and a transmit signal path. The receive signal path of the radio IC circuitry 1606a may include at least mixer circuitry 1802, such as, for example, down-conversion mixer circuitry, amplifier circuitry 1806 and filter circuitry 1808. The transmit signal path of the radio IC circuitry 1606a may include at least filter circuitry 1812 and mixer circuitry 1814, such as, for example, upconversion mixer circuitry. Radio IC circuitry 1606a may also include synthesizer circuitry 1804 for synthesizing a frequency 1805 for use by the mixer circuitry 1802 and the mixer circuitry 1814. The mixer circuitry 1802 and/or 1814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 18 illustrates only a simplified version of a radio IC circuitry, and may include, although not shown, embodiments where each of the depicted circuitries may include more than one component. For instance, mixer circuitry 1814 may each include one or more mixers, and filter circuitries 1808 and/or 1812 may each include one or more filters, such as one or more BPFs and/or LPFs according to application needs. For example, when mixer circuitries are of the direct-conversion type, they may each include two or more mixers.

In some embodiments, mixer circuitry 1802 may be configured to down-convert RF signals 1707 received from the FEM circuitry 1604a-b (FIG. 16) based on the synthesized frequency 1805 provided by synthesizer circuitry 1804. The amplifier circuitry 1806 may be configured to amplify the down-converted signals and the filter circuitry 1808 may include an LPF configured to remove unwanted signals from the down-converted signals to generate output baseband signals 1807. Output baseband signals 1807 may be provided to the baseband processing circuitry 1608a-b (FIG. 16) for further processing. In some embodiments, the output baseband signals 1807 may be zero-frequency baseband signals, although this is not a requirement. In some embodiments, mixer circuitry 1802 may comprise passive mixers, although the scope of the embodiments is not limited in this respect.

In some embodiments, the mixer circuitry 1814 may be configured to up-convert input baseband signals 1811 based on the synthesized frequency 1805 provided by the synthesizer circuitry 1804 to generate RF output signals 1709 for the FEM circuitry 1604a-b. The baseband signals 1811 may be provided by the baseband processing circuitry 1608a-b and may be filtered by filter circuitry 1812. The filter circuitry 1812 may include an LPF or a BPF, although the scope of the embodiments is not limited in this respect.

In some embodiments, the mixer circuitry 1802 and the mixer circuitry 1814 may each include two or more mixers and may be arranged for quadrature down-conversion and/or upconversion respectively with the help of synthesizer 1804. In some embodiments, the mixer circuitry 1802 and the mixer circuitry 1814 may each include two or more mixers each configured for image rejection (e.g., Hartley image rejection). In some embodiments, the mixer circuitry 1802 and the mixer circuitry 1814 may be arranged for direct down-conversion and/or direct upconversion, respectively. In some embodiments, the mixer circuitry 1802 and the mixer circuitry 1814 may be configured for super-heterodyne operation, although this is not a requirement.

Mixer circuitry 1802 may comprise, according to one embodiment: quadrature passive mixers (e.g., for the in-phase (I) and quadrature phase (Q) paths). In such an embodiment, RF input signal 1707 from FIG. 18 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1805 of synthesizer 1804 (FIG. 18). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 1707 (FIG. 17) may comprise a balanced signal, although the scope of the embodiments is not limited in this respect. The I and Q baseband output signals may be provided to low-noise amplifier, such as amplifier circuitry 1806 (FIG. 18) or to filter circuitry 1808 (FIG. 18).

In some embodiments, the output baseband signals 1807 and the input baseband signals 1811 may be analog baseband signals, although the scope of the embodiments is not limited in this respect. In some alternate embodiments, the output baseband signals 1807 and the input baseband signals 1811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1804 may be a fractional-N synthesizer or a fractional N/N+1 synthesizer, although the scope of the embodiments is not limited in this respect as other types of frequency synthesizers may be suitable. For example, synthesizer circuitry 1804 may be a delta-sigma synthesizer, a frequency multiplier, or a synthesizer comprising a phase-locked loop with a frequency divider. According to some embodiments, the synthesizer circuitry 1804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1804 may be provided by a voltage controlled oscillator (VCO), although that is not a requirement. A divider control input may further be provided by either the baseband processing circuitry 1608a-b (FIG. 16) depending on the desired output frequency 1805. In some embodiments, a divider control input (e.g., N) may be determined from a look-up table (e.g., within a Wi-Fi card) based on a channel number and a channel center frequency as determined or indicated by the example application processor 1610. The application processor 1610 may include, or otherwise be connected to, one of the example secure signal converter 101 or the example received signal converter 103 (e.g., depending on which device the example radio architecture is implemented in).

In some embodiments, synthesizer circuitry 1804 may be configured to generate a carrier frequency as the output frequency 1805, while in other embodiments, the output frequency 1805 may be a fraction of the carrier frequency (e.g., one-half the carrier frequency, one-third the carrier frequency). In some embodiments, the output frequency 1805 may be a LO frequency (fLO).

Figure 19:
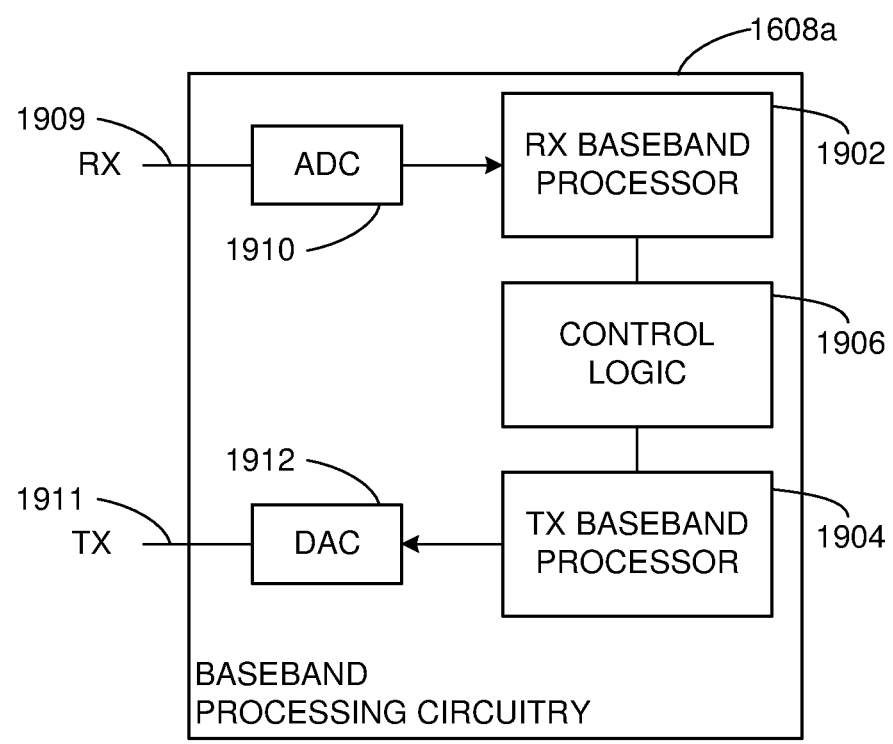
FIG. 19 illustrates an example baseband processing circuitry for use in the radio architecture of FIG. 16, in accordance with one or more example embodiments of the present disclosure.

FIG. 19 illustrates a functional block diagram of baseband processing circuitry 1608a in accordance with some embodiments. The baseband processing circuitry 1608a is one example of circuitry that may be suitable for use as the baseband processing circuitry 1608a (FIG. 16), although other circuitry configurations may also be suitable. Alternatively, the example of FIG. 18 may be used to implement the example BT baseband processing circuitry 1608b of FIG. 16.

The baseband processing circuitry 1608a may include a receive baseband processor (RX BBP) 1902 for processing receive baseband signals 1809 provided by the radio IC circuitry 1606a-b (FIG. 16) and a transmit baseband processor (TX BBP) 1904 for generating transmit baseband signals 1811 for the radio IC circuitry 1606a-b. The baseband processing circuitry 1608a may also include control logic 1906 for coordinating the operations of the baseband processing circuitry 1608a.

In some embodiments (e.g., when analog baseband signals are exchanged between the baseband processing circuitry 1608a-b and the radio IC circuitry 1606a-b), the baseband processing circuitry 1608a may include ADC 1910 to convert analog baseband signals 1909 received from the radio IC circuitry 1606a-b to digital baseband signals for processing by the RX BBP 1902. In these embodiments, the baseband processing circuitry 1608a may also include DAC 1912 to convert digital baseband signals from the TX BBP 1904 to analog baseband signals 1911.

In some embodiments that communicate OFDM signals or OFDMA signals, such as through baseband processor 1608a, the transmit baseband processor 1904 may be configured to generate OFDM or OFDMA signals as appropriate for transmission by performing an inverse fast Fourier transform (IFFT). The receive baseband processor 1902 may be configured to process received OFDM signals or OFDMA signals by performing an FFT. In some embodiments, the receive baseband processor 1902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 16, in some embodiments, the antennas 1601 (FIG. 16) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1601 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a multi-link communication with a first multi-link device comprising two or more links associated with two or more station devices (STAs) included in the first multi-link device; determine a first medium access control (MAC) address associated with a first link of the two or more links; determine a second MAC address associated with a second link of the two or more links; generate one or more pairwise security keys to be used in the multi-link communication on the two or more links; and cause to send a frame to the first multi-link device using at least one combination of the one or more pairwise security keys.

Example 2 may include the device of example 1 and/or some other example herein, wherein the one or more pairwise security keys include a same pairwise transient key (PTK) across each of the plurality of links or a same PTK security association (PTKSA) across each of the plurality of links.

Example 3 may include the device of example 1 and/or some other example herein, wherein the processing circuitry may be further configured to include an authenticator address as the device address.

Example 4 may include the device of example 1 and/or some other example herein, wherein the one or more pairwise security keys include a different group temporal key (GTK) across each of the plurality of links or a different GTK security association (GTKSA) across each of the plurality of links.

Example 5 may include the device of example 4 and/or some other example herein, wherein information of different lengths may be included in an Extensible Authentication Protocol (EAP) over LAN (EAPoL)-key frame.

Example 6 may include the device of example 1 and/or some other example herein, wherein the one or more pairwise security keys include a different integrity group temporal key (IGTK) across each of the plurality of links or a different IGTK security association (IGTKSA) across each of the plurality of links.

Example 7 may include the device of example 6 and/or some other example herein, wherein information of different lengths may be included in an Extensible Authentication Protocol (EAP) over LAN (EAPoL)-key frame.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send the frame.

Example 10 may include a non-transitory computer-readable medium storing computer-executable instructions which when executed by one or more processors result in performing operations comprising: determining a multi-link communication with a first multi-link device comprising two or more links associated with two or more station devices (STAs) included in the first multi-link device; determining a first medium access control (MAC) address associated with a first link of the two or more links; determining a second MAC address associated with a second link of the two or more links; generating one or more pairwise security keys to be used in the multi-link communication on the two or more links; and causing to send a frame to the first multi-link device using at least one combination of the one or more pairwise security keys.

Example 11 may include the non-transitory computer-readable medium of example 10 and/or some other example herein, wherein the one or more pairwise security keys include a same pairwise transient key (PTK) across each of the plurality of links or a same PTK security association (PTKSA) across each of the plurality of links.

Example 12 may include the non-transitory computer-readable medium of example 10 and/or some other example herein, wherein the operations further comprise including an authenticator address as the device address.

Example 13 may include the non-transitory computer-readable medium of example and and/or some other example herein, wherein the one or more pairwise security keys include a different group temporal key (GTK) across each of the plurality of links or a different GTK security association (GTKSA) across each of the plurality of links.

Example 14 may include the non-transitory computer-readable medium of example 13 and/or some other example herein, wherein information of different lengths may be included in an Extensible Authentication Protocol (EAP) over LAN (EAPoL)-key frame.

Example 15 may include the non-transitory computer-readable medium of example 10 and/or some other example herein, wherein the one or more pairwise security keys include a different integrity group temporal key (IGTK) across each of the plurality of links or a different IGTK security association (IGTKSA) across each of the plurality of links.

Example 16 may include the non-transitory computer-readable medium of example 15 and/or some other example herein, wherein information of different lengths may be included in an Extensible Authentication Protocol (EAP) over LAN (EAPoL)-key frame.

Example 17 may include a method comprising: determining, by one or more processors, a multi-link communication with a first multi-link device comprising two or more links associated with two or more station devices (STAs) included in the first multi-link device; determining a first medium access control (MAC) address associated with a first link of the two or more links; determining a second MAC address associated with a second link of the two or more links; generating one or more pairwise security keys to be used in the multi-link communication on the two or more links; and causing to send a frame to the first multi-link device using at least one combination of the one or more pairwise security keys.

Example 18 may include the method of example 17 and/or some other example herein, wherein the one or more pairwise security keys include a same pairwise transient key (PTK) across each of the plurality of links or a same PTK security association (PTKSA) across each of the plurality of links.

Example 19 may include the method of example 17 and/or some other example herein, further comprising including an authenticator address as the device address.

Example 20 may include the method of example 17 and/or some other example herein, wherein the one or more pairwise security keys include a different group temporal key (GTK) across each of the plurality of links or a different GTK security association (GTKSA) across each of the plurality of links.

Example 21 may include the method of example 20 and/or some other example herein, wherein information of different lengths may be included in an Extensible Authentication Protocol (EAP) over LAN (EAPoL)-key frame.

Example 22 may include the method of example 17 and/or some other example herein, wherein the one or more pairwise security keys include a different integrity group temporal key (IGTK) across each of the plurality of links or a different IGTK security association (IGTKSA) across each of the plurality of links.

Example 23 may include the method of example 22 and/or some other example herein, wherein information of different lengths may be included in an Extensible Authentication Protocol (EAP) over LAN (EAPoL)-key frame.

Example 24 may include an apparatus comprising means for: determine a multi-link communication with a first multi-link device comprising two or more links associated with two or more station devices (STAs) included in the first multi-link device; determine a first medium access control (MAC) address associated with a first link of the two or more links; determine a second MAC address associated with a second link of the two or more links; generate one or more pairwise security keys to be used in the multi-link communication on the two or more links; and cause to send a frame to the first multi-link device using at least one combination of the one or more pairwise security keys.

Example 25 may include the apparatus of example 24 and/or some other example herein, wherein the one or more pairwise security keys include a same pairwise transient key (PTK) across each of the plurality of links or a same PTK security association (PTKSA) across each of the plurality of links.

Example 26 may include the apparatus of example 24 and/or some other example herein, further comprising include an authenticator address as the device address.

Example 27 may include the apparatus of example 24 and/or some other example herein, wherein the one or more pairwise security keys include a different group temporal key (GTK) across each of the plurality of links or a different GTK security association (GTKSA) across each of the plurality of links.

Example 28 may include the apparatus of example 27 and/or some other example herein, wherein information of different lengths may be included in an Extensible Authentication Protocol (EAP) over LAN (EAPoL)-key frame.

Example 29 may include the apparatus of example 24 and/or some other example herein, wherein the one or more pairwise security keys include a different integrity group temporal key (IGTK) across each of the plurality of links or a different IGTK security association (IGTKSA) across each of the plurality of links.

Example 30 may include the apparatus of example 29 and/or some other example herein, wherein information of different lengths may be included in an Extensible Authentication Protocol (EAP) over LAN (EAPoL)-key frame.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 32 may include an apparatus comprising logic, modules, and/or circuitry to perform one or more elements of a method described in or related to any of examples 1-26, or any other method or process described herein.

Example 33 may include a method, technique, or process as described in or related to any of examples 1-32, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-33, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for sharing a pairwise master key (PMK) and a pairwise master key security association (PMKSA) between a first multi-link device (MLD) and a second MLD, the device comprising processing circuitry coupled to storage, the processing circuitry configured to:
   establish a multi-link communication between two or more first station devices (STAs) of the first MLD and two or more second STAs of a second MLD using two or more links, wherein each STA of the two or more first STAs is singly addressable instance within the first MLD;
   use an extensible authentication protocol (EAP) or a simultaneous authentication of equals (SAE) protocol to generate the PMK, wherein an authenticator address for the PMKSA is a first device address of the first MLD, and a supplicant address for the PMKSA is a second device address of the second MLD;
   compute a pairwise master key identifier (PMKID) based on the authenticator address; and
   use the PMK as a same key across the two or more links.

2. The device of claim 1, wherein the processing circuitry is further configured to:
   generate a frame header comprising one or more fields; and
   generate an additional authentication data (AAD) by utilizing at least one of the one or more fields of the frame header, wherein one of the at least one of the one or more fields is an address field.

3. The device of claim 2, wherein the AAD is comprised of two or more address fields, wherein a second address field (A2) is set to be equal to a medium access control (MAC) address of the first MLD.

4. The device of claim 1, wherein a pairwise transient key (PTK) and a pairwise transient key security association (PTKSA) are shared across links.

5. The device of claim 4, wherein the PTK and the PTKSA are shared across links by setting the authenticator address as a first device address of the first MLD and the supplicant address as a second device address of the second MLD.

6. The device of claim 1, wherein the processing circuitry is further configured to:
   replace a medium access control (MAC) address on both sides with device addresses of the first MLD and the second MLD when a simultaneous authentication of equals (SAE) protocol is used; and
   modify an additional authentication data (AAD) by using a transmitter device address for A2 and a receiver device address for A1.

7. The device of claim 6, wherein the processing circuitry is further configured to modify a counter with cipher block chaining message authentication code (CCM) nonce by using the transmitter device address for A2.

8. The device of claim 7, wherein the first MLD or the second MLD has a capability bit to indicate if changing the AAD or the CCM nonce is supported.

9. A non-transitory computer-readable medium storing computer-executable instructions which when executed by one or more processors, for sharing a pairwise master key (PMK) and a pairwise master key security association (PMKSA) between a first multi-link device (MLD) and a second MLD, result in performing operations comprising:
   establishing a multi-link communication between two or more first station devices (STAs) of the first MLD and two or more second STAs of a second MLD using two or more links, wherein each STA of the two or more first STAs is singly addressable instance within the first MLD;
   using an extensible authentication protocol (EAP) or a simultaneous authentication of equals (SAE) protocol to generate the PMK, wherein an authenticator address for the PMKSA is a first device address of the first MLD, and a supplicant address for the PMKSA is a second device address of the second MLD;
   computing a pairwise master key identifier (PMKID) based on the authenticator address; and
   using the PMK as a same key across the two or more links.

10. The non-transitory computer-readable medium of claim 9, wherein the operations further comprise:
    generating a frame header comprising one or more fields; and
    generating an additional authentication data (AAD) by utilizing at least one of the one or more fields of the frame header, wherein one of the at least one of the one or more fields is an address field.

11. The non-transitory computer-readable medium of claim 10, wherein the AAD is comprised of two or more address fields, wherein a second address field (A2) is set to be equal to a medium access control (MAC) address of the first MLD.

12. The non-transitory computer-readable medium of claim 9, wherein a pairwise transient key (PTK) and a pairwise transient key security association (PTKSA) are shared across links.

13. The non-transitory computer-readable medium of claim 12, wherein the PTK and the PTKSA are shared across links by setting the authenticator address as a first device address of the first MLD and the supplicant address as a second device address of the second MLD.

14. The non-transitory computer-readable medium of claim 9, wherein the operations further comprise:
    replacing a medium access control (MAC) address on both sides with device addresses of the first MLD and the second MLD when a simultaneous authentication of equals (SAE) protocol is used; and
    modifying an additional authentication data (AAD) by using a transmitter device address for A2 and a receiver device address for A1.

15. The non-transitory computer-readable medium of claim 14, wherein the operations further comprise modifying a counter with cipher block chaining message authentication code (CCM) nonce by using the transmitter device address for A2.

16. The non-transitory computer-readable medium of claim 15, wherein the first MLD or the second MLD has a capability bit to indicate if changing the AAD or the CCM nonce is supported.

17. A method for sharing a pairwise master key (PMK) and a pairwise master key security association (PMKSA) between a first multi-link device (MLD) and a second MLD, the method comprising:
    establishing a multi-link communication between two or more first station devices (STAs) of the first MLD and two or more second STAs of a second MLD using two or more links, wherein each STA of the two or more first STAs is singly addressable instance within the first MLD;

using an extensible authentication protocol (EAP) or a simultaneous authentication of equals (SAE) protocol to generate the PMK, wherein an authenticator address for the PMKSA is a first device address of the first MLD, and a supplicant address for the PMKSA is a second device address of the second MLD;

computing a pairwise master key identifier (PMKID) based on the authenticator address; and using the PMK as a same key across the two or more links.

18. The method of claim 17, further comprising:

generating a frame header comprising one or more fields; and generating an additional authentication data (AAD) by utilizing at least one of the one or more fields of the frame header, wherein one of the at least one of the one or more fields is an address field.

19. The method of claim 18, wherein the AAD is comprised of two or more address fields, wherein a second address field (A2) is set to be equal to a medium access control (MAC) address of the first MLD.

20. The method of claim 17, wherein a pairwise transient key (PTK) and a pairwise transient key security association (PTKSA) are shared across links.

* * * * *